Nov. 18, 1958

W. W. WHEATER 2,860,479

REEL SUPPORTING CRADLES

Filed Dec. 16, 1953

INVENTOR.
William W. Wheater
BY
S. Ernest Low.
ATTORNEY

Nov. 18, 1958

W. W. WHEATER 2,860,479

REEL SUPPORTING CRADLES

Filed Dec. 16, 1953

INVENTOR.
William W. Wheater
BY
S. Ernest Low.
ATTORNEY

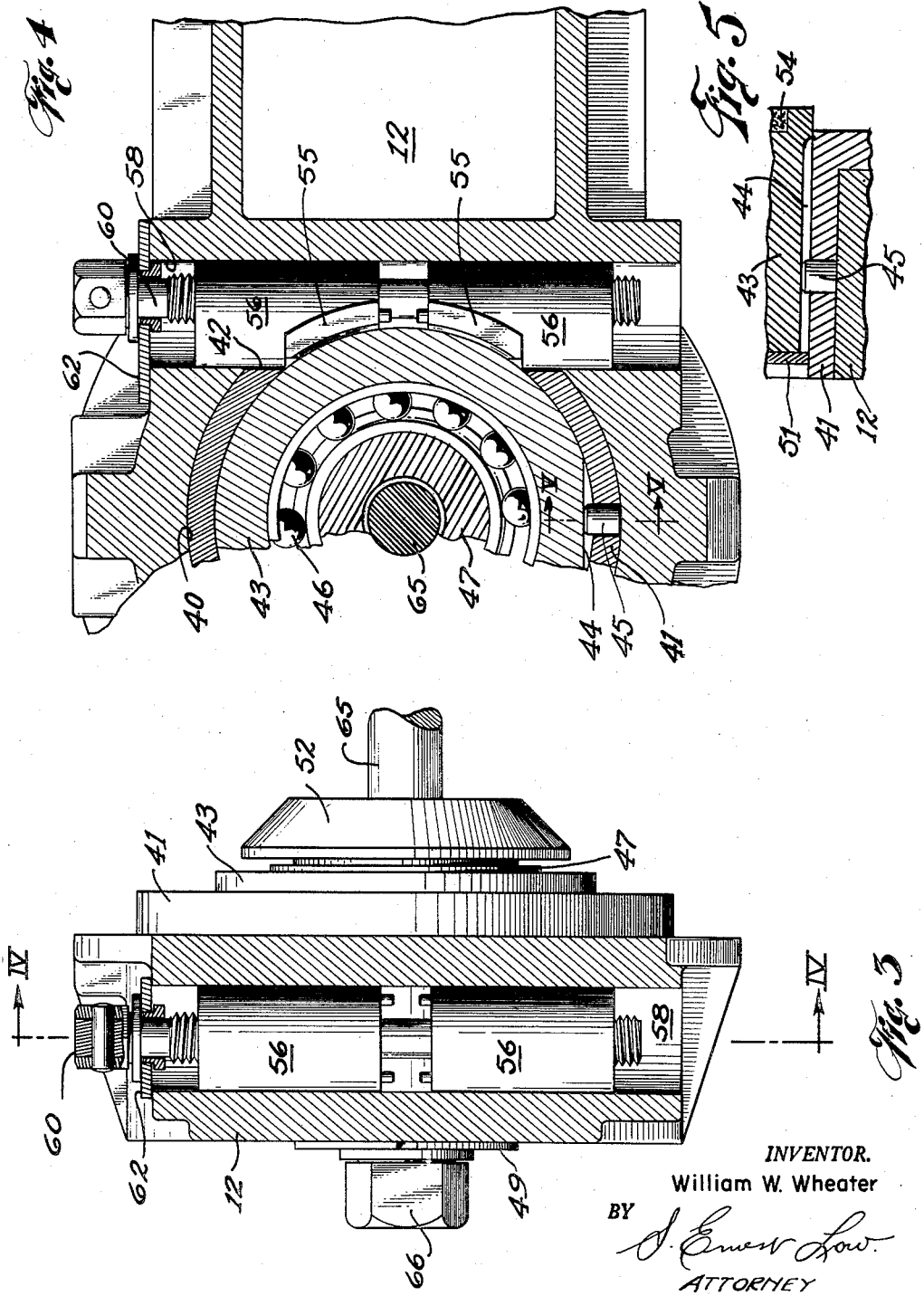

United States Patent Office 2,860,479
Patented Nov. 18, 1958

2,860,479

REEL SUPPORTING CRADLES

William W. Wheater, Massena, N. Y., assignor to Aluminum Company of America, Pittsburgh, Pa., a corporation of Pennsylvania Application December 16, 1953, Serial No. 398,570

3 Claims. (Cl. 57—65)

This invention relates in general to cable stranding equipment and is particularly directed to the design and construction of cradle devices employed for supporting reels or spools in planetary cable, rope and similar strand laying and closing mechanisms of the general type described and illustrated in United States Letters Patent 1,712,406, issued May 7, 1929.

It is a well known fact that the rotation of the several supply reels, arranged about the central axis of a planetary strander, gives rise to extremely high forces and proportionally large stresses in the cradle members supporting the supply reels. It will be further understood that the magnitude of the forces and stresses developed and generated in such equipment is dependent upon the mass and weight of the loaded supply reels, as well as their distribution in respect to, and speed of rotation about, the central axis of the rotating heads of a planetary strander supporting the reels. Directional changes in the application of the forces also give rise to reverse stressing and fatigue failures in the cradle structures employed in planetary stranders with resulting high maintenance and replacement requirements in the equipment.

Several general types of cradles for supporting the reels on the rotating heads of planetary stranding equipment have been employed with varying degrees of success. For example, open-sided cradles of generally C-shape, which permit charging and replacing reels through the open side thereof, have been used. This type of equipment has had to be operated at relatively low rotational speeds because of the inherent tendency of the cradles to spread or separate across their unsupported open sides. Boat type cradles have, to a great extent, been substituted for the open-sided C-type cradles in which cases the supply reels are each supported within a surrounding cradle of generally boat-like construction. The boat type cradle has also been limited in its use to rotational speeds only slightly higher than employed with the open-sided C-type cradles to insure minimum "breathing," or movement of the oppositely disposed cradle legs supporting the reels, as a result of changes in direction and intensity of the applied centrifugal forces during every revolution of the planetary strander heads supporting the cradles and reels.

It is an object of the invention to provide a cradle structure which will permit higher rotational speeds for planetary stranders employing the same than are presently possible with known equipment.

Another object of the invention is to provide a simplified form of boat type cradle incorporating a demountable reel supporting mechanism.

Another object of the invention is to provide a reel supporting cradle structure which insures maximum dynamic balance in a planetary type strander.

A further object is to provide a boat type cradle in which the oppositely disposed legs or arms supporting a reel are restrained against relative separating movement as a result of applied forces developed through rotation of the cradle in its use in a planetary strander.

It is a further and significant object of the invention to provide a reel supporting cradle structure of the boat type in which the oppositely disposed legs or arms supporting the reel act together to carry the load produced by centrifugal force, and in which the load is equally divided between the two cradle supporting legs or arms, to thereby reduce the stresses developed in the cradle structure.

It is also an object to provide a cradle structure for supporting a reel between oppositely disposed legs or arms thereof in a manner to insure equal distribution of the thrust on the oppositely disposed cradle legs resulting from centrifugal force acting on either side of a cradle and reel assembly in a planetary strander, as well as minimize torsional stresses in the reel supporting legs of the cradle resulting from vertical loading forces acting on the same.

Other objects and advantages will be understood and appreciated from consideration of the following description and illustrations, in which:

Fig. 3 represents a sectional elevational view, to enlarged scale, taken on the plane III—III of Fig. 1;

Fig. 4 represents a fragmentary sectional elevation taken on the plane IV—IV of Fig. 3; and Fig. 5 represents a fragmentary sectional elevation taken on the plane V—V of Fig. 4.

Figure 1:
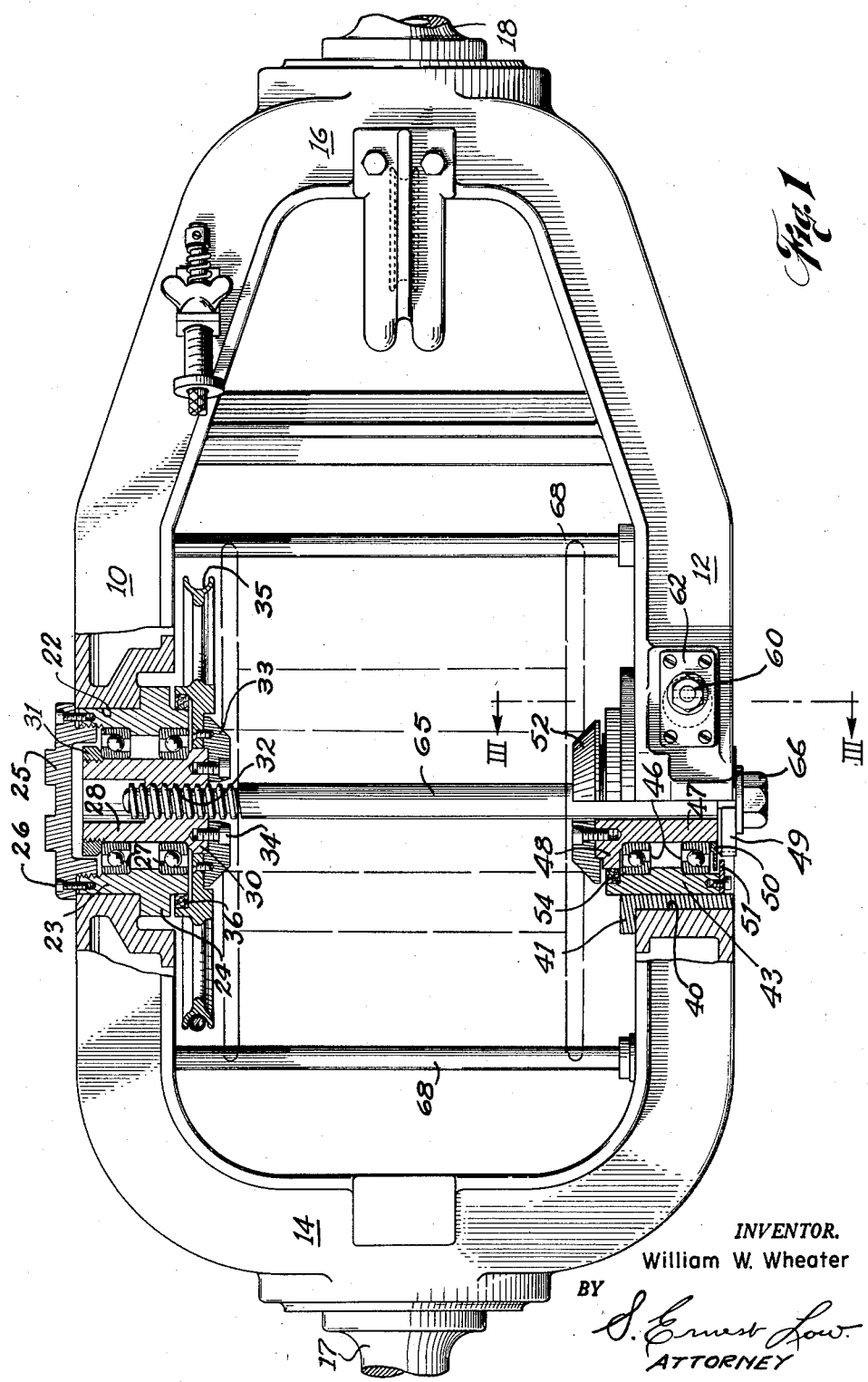
Fig. 1 represents a plan view, in partial section, illustrating a cradle device incorporating the improved structure of the invention.

The invention expressed in general terms relates to improvements in boat type cradle structures in which provision is made for supporting a supply reel or spool between oppositely disposed legs or arms of the cradle, which are otherwise joined in closed connection with the opposite end portions or frame members of the cradle. An example of the cradle and reel assembly thus far described will be found on reference to United States Letters Patent 2,270,093, issued January 13, 1942.

The invention in more specific terms is directed to a cradle in which a reel or spool is rotatably clamped between oppositely disposed legs or arms of the cradle, which are restrained by a positive tie member connecting the oppositely disposed cradle legs co-axially through the spool or reel.

Referring more particularly to the appended drawings, the boat type cradle of the invention is preferably constructed as a steel casting and comprises a closed frame structure having oppositely disposed, parallel legs or arms 10 and 12 joined in closed connection by means of end members 14 and 16. The general outline of the cradle, and area enclosed thereby, assume the shape of a boat having side rails 10 and 12, a relatively blunt stern section 14, and a pointed bow 16, from which boat outline the cradle gets its name. Axially aligned trunnion stub shafts 17 and 18 are preferably rigidly bolted to cradle end members 14 and 16, respectively, and serve to support the cradle between rotatable head plates or wheel discs 19 and 20 of a planetary strander carrying a number of such cradles.

The side arm or leg 10 of the cradle is provided with an aperture 22 extending therethrough and within which a housing member 23 is secured. Housing member 23 is preferably provided with a protruding shoulder or flange 24 and a threadedly attached, flanged cap nut 25 between which the housing is securely clamped to the cradle leg 10. Locking screws 26 extending through the cap nut 25 into threaded engagement with the housing 23 insure unitary clamped assembly of the housing with the cradle leg 10.

Spaced anti-friction radial thrust bearings 27, installed within race receiving grooves or internal counterbored surfaces in the housing 23, rotatably support a pintle or hub member 28 in fixed axial relationship in respect to the housing and cradle leg. An integral flange 30 on the hub member 28 and a bearing lock nut 31 engage the inner races of the spaced anti-friction bearings 27 and insure non-axially movable thrust assembly of the hub 28 within its housing 23. The hub member 28 is also internally threaded at 32 and has an annular frusto-conical flange 33 secured to its inner end by means of screws 34. A friction sheave or grooved pulley 35 is also provided in unitary attachment with respect to the rotatable hub or pintle member 28, the sheave being attached by screws or the like to the rear face of the frusto-conical flange 33. An oil seal 36 interposed the hub of sheave 35 and housing 23 prevents bearing lubrication leakage from the interior of the housing.

Figure 2:
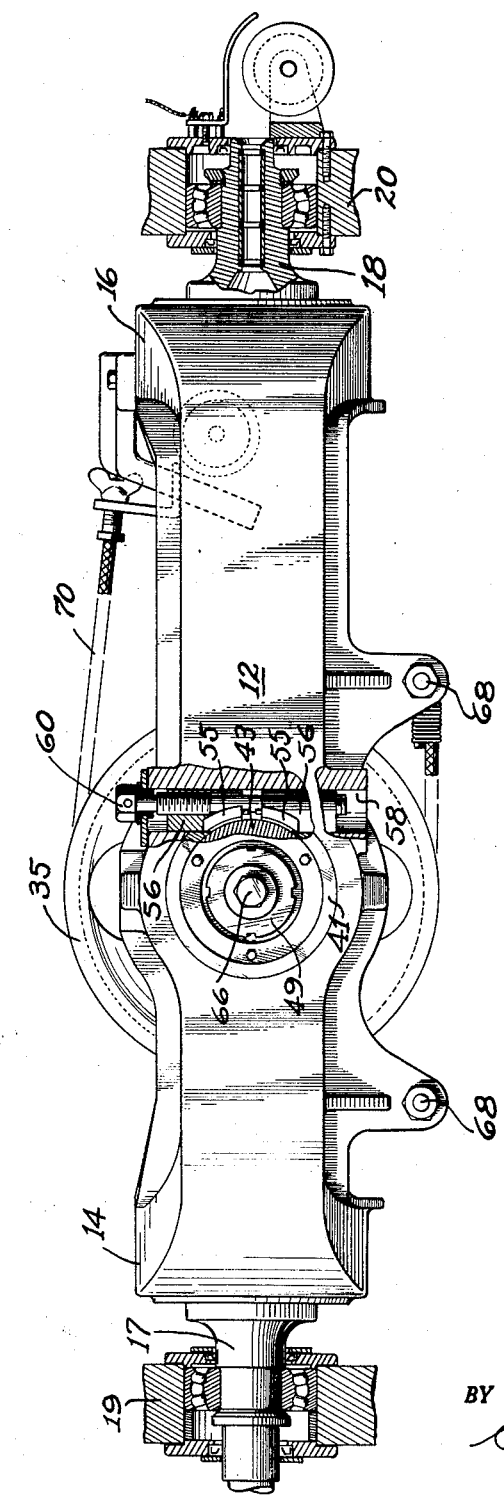
Fig. 2 represents a side elevational view, in partial section, of the mechanism of Fig. 1.

An aperture 40 is provided through the leg 12 of the cradle in axial alignment with the aperture 22 in oppositely disposed leg 10 of the cradle. A flanged sleeve bushing 41 is installed within the aperture 40, as by a press fit therein, and is provided with a window 42 through the cylindrical wall thereof intermediate the length of the bushing, as best illustrated in Figs. 2 and 4. A cylindrical housing 43 is slidably installed within the cylindrical bore in bushing 41, a keyway 44 machined on the outer underside of housing 43 receiving a dowel pin 45 carried by the bushing 41, which construction limits axial relative movement of the housing within the bushing so that the housing 43 will not be translated entirely out of its surrounding bushing 41.

Housing member 43 is internally counterbored to receive the outer races of space anti-friction radial thrust bearings 46, which rotatably support an inner hub or pintle member 47 of tubular, outwardly flanged construction. The outwardly projecting flange 48 on the hub member 47 and a bearing lock nut 49 insure non-axially movable thrust assembly of the hub member 47 and housing 43 through clamping engagement with the inner races of the spaced bearings 46, an oil slinger ring 50 being interposed the bearing lock nut 49 and its adjacent bearing race and cooperating with a spaced capping ring 51 carried by the housing 43 to provide a bearing lubrication seal at the lower or outer end of the hub and housing assembly in the leg 12 of the cradle, as illustrated to best advantage in Fig. 1.

The inner or flanged end of tubular hub member 47 has a frusto-conical annular flange 52, similar to the previously described flange 33, secured thereto by suitable fastening screws, a second oil seal 54 being installed between the housing 43 and hub 47 to prevent bearing lubrication leakage from the inner end of the hub and housing assembly in leg 12 of the cradle.

It is to be observed from the cradle structure thus far described that the rotatably mounted hub or pintle member 28 is secured in the leg 10 of the cradle against axial movement in respect thereto. As distinguished from the non-axially movable hub member 28, the hub or pintle member 47 in the leg 12 is rotatably secured within its housing 43 and is axially movable therewith as a unit in axial alignment with the hub member 28 in the oppositely disposed cradle leg 10.

A locking device is provided for securing the unitary axially movable hub 47 and housing 43 assembly in respect to its spaced distance from the axially fixed unitary hub 28 and housing 23 assembly. This locking device comprises a pair of opposed clamping inserts or shoes 55 disposed within the window 42 in the wall of bushing 41, the shoes being provided with arcuate bearing surfaces for engagement with the outer cylindrical surface of the housing 43 in registry with the window 42, as shown to best advantage in Figs. 2 and 4. Actuating mechanism for the shoes 55 comprises vertically opposed locking elements 56 slidably supported within an aperture 58 through the cradle leg 12, the aperture 58 being located immediately adjacent the shoes 55 and axially parallel to the plane of the window 42 in the bushing 41. Each of the locking elements 56 is machined to present a surface in complementary engagement with the rear surface of its adjacent clamping shoe 55, and a bolt member 60 provided with right and left hand threads towards its opposite ends threadedly engages the locking elements 56 and supports the same in spaced relationship on the bolt. The bolt 60 is limited in axial movement by means of a freely rotatable connection to a cover plate 62 secured to a suitable pad surface formed on the cradle leg 12. It will be seen that manipulation of the bolt 60 to rotate the same will serve to draw the clamping shoes 55 into or out of clamping engagement on the cylindrical surface of the housing 43. It will also be understood that axial adjustment of the housing 43 and its unitarily mounted pintle member 47, in respect to the bushing 41 and cradle leg 12, is provided for through manipulation of the bolt 60 to release the clamping shoes 55 and permit axial sliding of the housing 43 and pintle 47 as a unit, the dowel pin 45 and keyway 44 insuring guided translatory movement. A replaceable tie bolt 65 is provided for insertion through tubular pintle member 47 into threaded engagement with the internally threaded socket 32 in the hub member 28, the headed end 66 of the tie bolt bearing on the outer end plane surface of the pintle member 47.

In the preferred operation and use of the cradle structure described above, a reel of stranding material is lowered between the legs 10 and 12 of the cradle into initial supporting relationship upon cross bolts or rods 68, with the reel axis in substantial alignment with the axis through the spaced reel supporting frusto-conical flanges 33 and 52. Insertion of the tie bolt 65 through the tubular pintle member 47 into threaded engagement with the internal threaded socket 32 in the pintle 28, and rotation and tightening of the tie bolt to a prestressed condition, serves to draw the frusto-conical reel supporting flanges 33 and 52 together to engage and support the supply reel. As the frusto-conical flanges are drawn together, the reel is raised to clear the two supporting bars 68 and center it on the axially aligned rotatable pintles 28 and 47.

Having installed a loaded supply reel in clamped relationship on its supporting flanges 33 and 52, and secured the axially slidable pintle housing 43 to the cradle leg 12 by manipulation of the lock bolt 60, it will be understood that centrifugal force acting radially outwardly to either side of a plane through the axis of rotation of the planetary strander head supporting the cradle and reel assembly will be carried and distributed equally between the oppositely disposed pintle-supporting cradle legs, because of the through tie bolt 65, in all positions of the rotating planetary strander head and cradle assembly. It will be further understood that the tie bolt construction also serves to distribute the thrust load, resulting from centrifugal force, equally between the opposed thrust bearings 27 and 46. In this latter connection one of the bearings 27 cooperates with one of the bearings 46 to carry the thrust load and transfer it to the cradle legs 10 and 12 in one direction of the centrifugal force, whereas the remaining two bearings 27 and 46 carry and transfer the load to the cradle legs in the opposite direction of application of the centrifugal force. The prestressed tie bolt 65, which draws the pintles 28 and 47 into rigid contact with the reel, also serves to minimize or neutralize torsional stress in the cradle legs 10 and 12, as a result of the vertically applied loading effect of the cradles during rotation of the planetary strander carrying the cradle and reel assembly.

Material in strand form from each supply reel, supported in a cradle as above described, is guided and drawn through the central bore in the trunnion stub shaft 18 in the normal operation of a planetary strander, an adjustable braking band or cable 70 cooperating with the sheave 35 providing back tension or snubbing action against uncontrolled withdrawal of the strand material from its supporting reel.

What is claimed is:

1. In a rotatable boat type cradle structure incorporating a pair of rotatable pintles disposed in axial alignment in oppositely disposed legs of the cradle, a tension bolt tie between the pintles urging the same into clamping relationship on a reel supported therebetween, one of said pintles being secured against other than rotational movement in its supporting cradle leg, the other pintle being initially movable in its supporting cradle leg co-axially towards and away from the first-mentioned pintle into and out of clamping relationship on the reel rotatably supported therebetween, and locking means for securing the second-mentioned pintle against relative movement other than rotational movement in its supporting cradle leg.

2. A rotatable type cradle pivotally supported on its major axis, a pintle rotatably supported in anti-friction radial thrust bearings in a leg of the cradle with its axis normal to the major axis of the cradle, said pintle being secured in the cradle leg against other than rotational movement, a second pintle rotatably assembled in an anti-friction radial thrust bearing mounting, said bearing mounting and pintle being slidably installed in axial alignment with the first-mentioned pintle in the oppositely disposed leg of the cradle, a tie member co-axial with the pintles and prestressed to draw and hold the oppositely disposed pintles in clamped relationship on a supply reel supported thereby, and locking means associated with said slidable pintle and its supporting cradle leg for restraining slidable relative movement therebetween.

3. A rotatable boat type cradle pivotally supported on its major axis on the rotary head of a planetary strander, said cradle being provided with a pair of rotatable pintles in axially aligned relationship, one each in oppositely disposed legs of the cradle in a plane normal to the major axis of the cradle, one of said pintles being secured axially in its supporting leg and the other pintle being initially slidable in its supporting leg for axial adjustment to clamp a supply reel on said rotatable pintles, a tie bolt co-axially connecting said pintles and prestressed to urge the pintles into clamped relationship on the supply reel, and a locking means for securing the initially slidable pintle to its supporting leg following prestressed assembly with the remaining pintle, said oppositely disposed cradle legs supporting the axially aligned pintles being unstressed in their assembly with the supply reel supported therebetween.

References Cited in the file of this patent

UNITED STATES PATENTS

| | | |
|---|---|---|
| 960,913 | Heany | June 7, 1910 |
| 2,177,812 | Robbins | Oct. 31, 1939 |
| 2,485,348 | Arnason | Oct. 18, 1949 |
| 2,593,838 | Bruestle | Apr. 22, 1952 |
| 2,681,544 | Bruestle | June 22, 17954 |
| 2,690,642 | Van Hook | Oct. 5, 1954 |
| 2,787,884 | Bruestle | Apr. 9, 1957 |

FOREIGN PATENTS

| | | |
|---|---|---|
| 667,937 | Germany | Nov. 23, 1938 |